US010887281B2

(12) United States Patent
Madden et al.

(10) Patent No.: US 10,887,281 B2
(45) Date of Patent: Jan. 5, 2021

(54) AUTOMATED HOST-BASED FIREWALL CONFIGURATION MANAGEMENT

(71) Applicant: salesforce.com, inc., San Francisco, CA (US)

(72) Inventors: John Madden, San Francisco, CA (US); Gabriele Roselli, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 359 days.

(21) Appl. No.: 15/847,229

(22) Filed: Dec. 19, 2017

(65) Prior Publication Data

US 2019/0190888 A1 Jun. 20, 2019

(51) Int. Cl.
*H04L 29/06* (2006.01)
*G06F 21/62* (2013.01)

(52) U.S. Cl.
CPC ...... *H04L 63/0263* (2013.01); *G06F 21/6281* (2013.01); *H04L 63/101* (2013.01)

(58) Field of Classification Search
CPC ... H04L 63/20; H04L 63/0263; H04L 63/101; H04L 41/12; G06F 21/6281; G06F 8/65; G06F 8/71
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |

(Continued)

OTHER PUBLICATIONS

CloudPassage, Inc., Devsecops: Enabling Security for Cloud Operations, 2017, pp. 1-5.

*Primary Examiner* — Yogesh Paliwal
(74) *Attorney, Agent, or Firm* — Schwabe Williamson & Wyatt (57) ABSTRACT

In an example, a computing system is configured to monitor for changes to a cloud environment that includes a configuration management system and one or more nodes to operate one or more first host-based firewall configurations, respectively, the host-based firewall configuration(s) generated based on code provided by the configuration management system; in response to a detection of a change, increment a version count associated with the cloud environment; identify a request from one of the nodes, the request including version information for a corresponding one of the host-based firewall configuration(s); compare the version information from the request to a current value of the version count; and in response to the comparison indicating a mismatch, control the node associated with the request to converge with the configuration management system to cause the node associated with the request to operate with a second host-based firewall configuration.

20 Claims, 4 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0096171 A1* | 4/2012 | Suit .................... H04L 12/6418 709/227 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0297774 A1* | 10/2014 | Munupalle ............ H04L 41/082 709/208 |
| 2014/0359537 A1 | 12/2014 | Jackobson et al. |
| 2015/0215166 A1* | 7/2015 | Sharan ................ H04L 41/0813 709/221 |
| 2018/0309623 A1* | 10/2018 | Szobi ................... H04L 41/082 |

\* cited by examiner

AUTOMATED HOST-BASED FIREWALL CONFIGURATION MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to automated host-based firewall configuration management.

DESCRIPTION OF THE RELATED ART

A configuration such as rules and/or IP tables can be used to control the flow of traffic into and/or out of a network (e.g., on a perimeter of a network, such as a private network, and another network, such as the Internet or other public network). The configuration may be configured in user space using a series of commands, and may be utilized by perimeter device (e.g., a hardware firewall device). This may be referred to as "network-based" firewalls.

In host-based firewalls, software (e.g., a firewall) may be installed on a host, such as a server. The software may independently manage outgoing and/or incoming traffic for that host. Use of host-based firewalls, e.g., in addition to use of network-based firewalls, may prevent malware on a private network from infecting other devices on the private network (via intra-network communications that would not even reach a network-based firewall).

Managing host-based firewall configurations of various devices on a network is important, particularly as the network scales (e.g., as an inventory of application servers changes). Improper management of host-based firewall configurations can lead to service interruptions for one or more of the application servers and/or a cloud services for a number of reasons.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in sonic other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for automated host-based firewall configuration management.

Some known schemes for deploying and maintaining host-based firewall configurations may experience problems in relatively large private networks and/or responsive to changes in the environment (e.g., changes to a node manifest such as a server manifest). In some examples, a relatively large environment (one or more networks) may include thousands of nodes, some or all of which may each have a host-based firewall configuration Each of these configurations may independently control intra-network communications between these nodes and/or internetwork communications between the node and devices on another networks, such as a public network coupled to the one or more networks.

There is a need to improve the deployment and maintenance as the environment changes (e.g., when the node manifest changes). Also, some of the known schemes may also lack node status and health information, which may lead to design deficiencies (both node configuration and node monitoring may occur in the same plane may be associated with reliability issues and inconsistency in node performance). Some of the known schemes may have limited ease of use features, which may lead to administrators selecting course-grained groups of nodes in the relatively large network to avoid complicated configuration. Such selections may reduce the security efficacy of the end configuration.

Some systems employing automated host-based firewall configuration management may address one or more of these problems. Some embodiments may leverage a configuration management systems and systems intelligence. In some embodiments, configuration and monitoring may be separate concerns. Some embodiments may scale and maintain ease of use for administrators as an environment scales.

Some embodiments described herein may use predictive intelligence to leverage the ease of use and idempotent nature of configuration management system runs (known as "converges") to ensure that a node has successfully checked in and has the proper firewall configuration based on predetermined role-based firewall configurations (e.g., web server configuration, database configuration, file server configuration, etc.). A firewall configuration based on a database role, for instance, may allow only the appropriate web servers access to its network port—the two roles optionally may be combined with other attributes to identify very narrow, specific, least-privilege-necessary point-to-point connections.

A version tracker may monitor the global state of a selected cloud environment making sure that, as hosts come and go (e.g., as a node manifest for the cloud environment changes), their IP addresses are automatically whitelisted or blacklisted from the available pool of addresses. The version tracker may utilize a monotonically increasing version number as a signal to nodes that they are behind and need to converge to pull down the new, correct firewall configuration.

Node agents on each of the nodes may authenticate against a web server to determine whether or not a change is needed, and may optionally execute a configuration management system client to produce that change. In some embodiments, the node agent may only authenticate against the web service and/or execute the configuration management system client. These node agents may be not require root-level privileges like some known node agents (on a UNIX system, the root user may have full privileges, e.g., root-level privileges, by default to every aspect of the system), which may increase the security of the system.

The web service may authenticate node requests (e.g., from the node agent) via public key infrastructure that may already exist in some existing configuration management tools such as Chef™. The web service may compare the node's firewall configuration version with one specified by the version tracker. The web service may use simple RESTful (representational state transfer) response codes to inform the node agent which action, if any, to take based on the comparison.

In some embodiments, a system employing automated host-based firewall configuration management may perform predictably in the case of one of its components experiencing unavailability. In the event of the configuration management system becoming unavailable (e.g., should a configuration management tool such as Chef™ be unavailable), configuration changes may not be made. Should the web service be unavailable, changes may still be made but may experience a delay less than or equal to convergence window. Should the version tracker be unavailable, dead nodes may not be removed from the available node IP address pool, which may not increase risk as some dead nodes may not release their IP addresses. Should the node agent fail to check in, an existing configuration management tool client (e.g., a Chef™ client) may continue to converge and correct node configurations with the convergence window delay.

I. Example System Overview

Figure 1A:
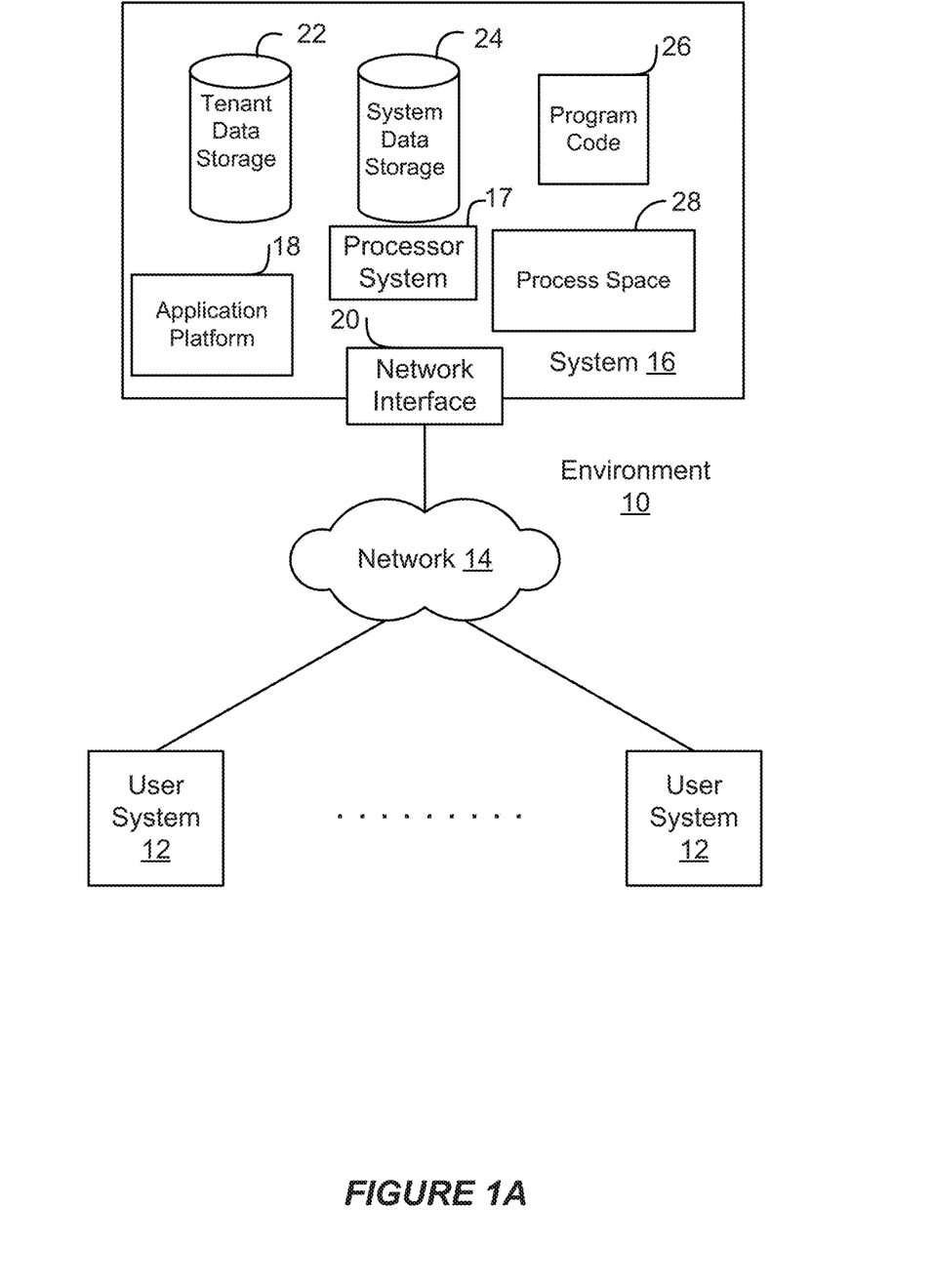
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MIS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 so typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
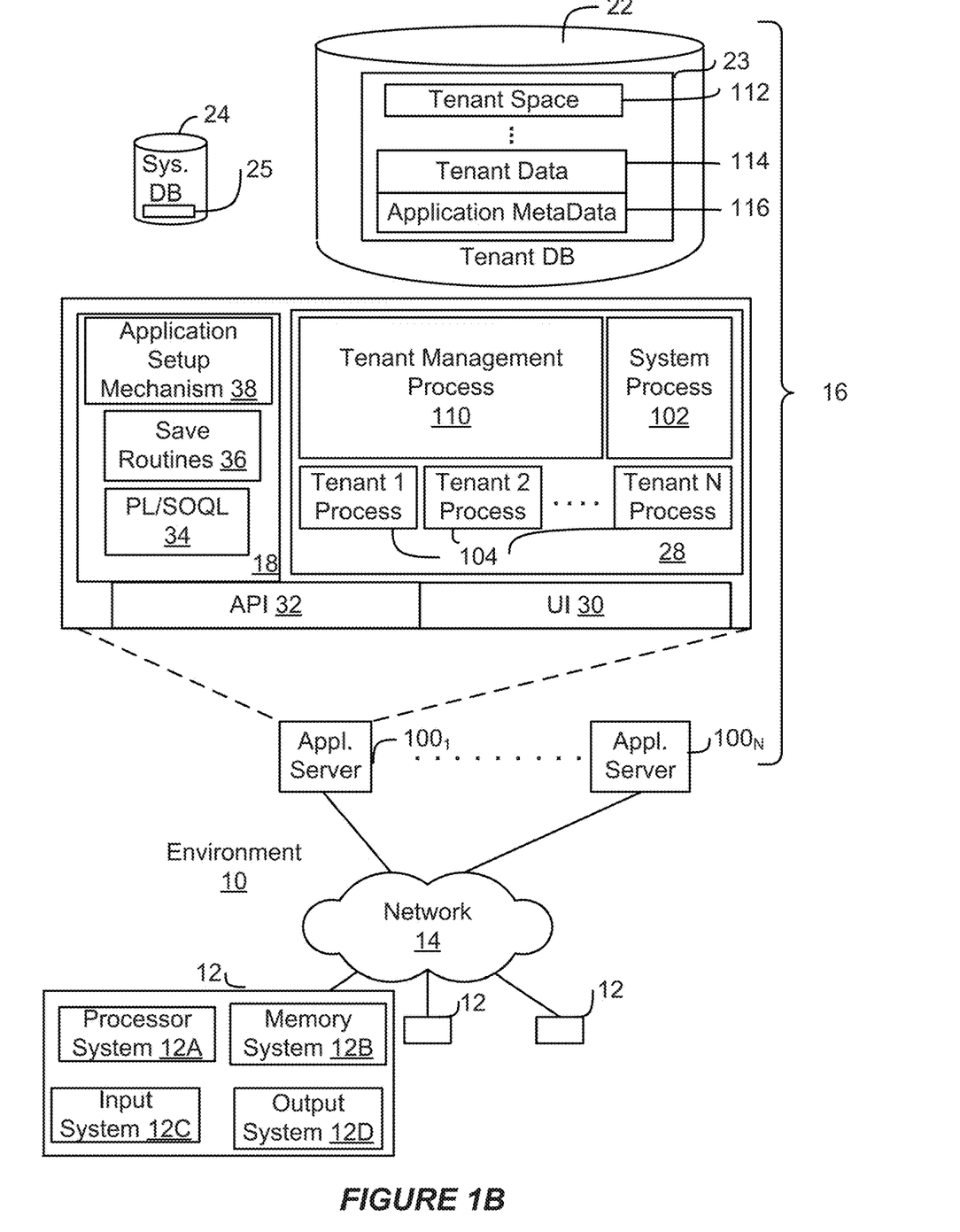
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can he saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can he desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can he a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can he stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Automated Host-Based Firewall Configuration Management

Figure 2:
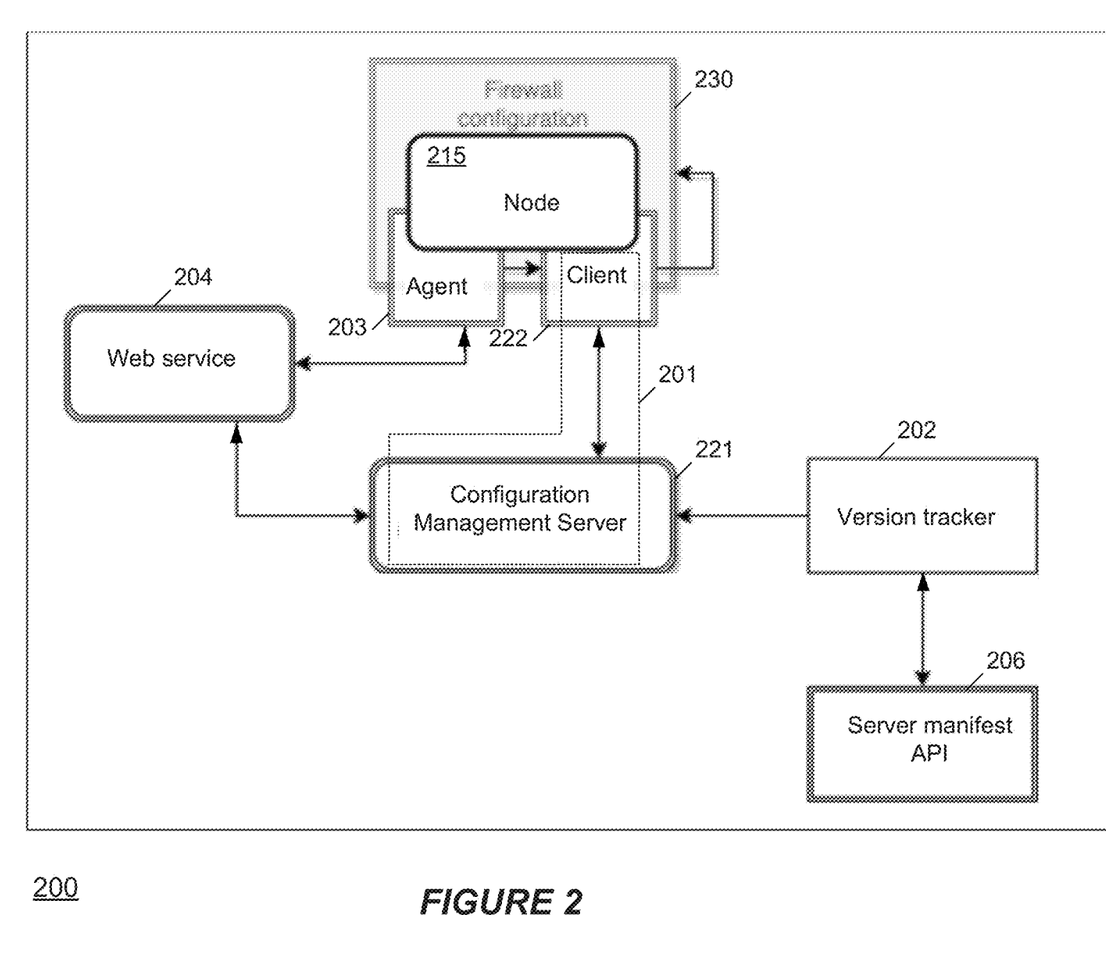
FIG. 2 illustrates a computing system for automated host-base firewall configuration management, in some embodiments.

FIG. 2 illustrates a computing system for automated host-based firewall configuration management, in some embodiments. The computing system 200 may include an agent 203 on a node 215, a web service 204, and a version tracker 202 to perform automated host-firewall configuration management. The operation of the agent 203, the web service 204, and the version tracker 202 may exploit information that may be collected by the configuration management system 221 and/or the server manifest API 206.

In some examples, the computing system 200 may be similar to any computing system described herein, for example any database system described with reference to FIGS. 1A-1B. The computing system 200 may include a plurality of application servers, such as any application servers described with reference to FIGS. 1A-B, e.g., any of the application servers $100_{1-N}$ (FIG. 1B). The node 215 may be one of the application servers. The agent 203 may be implemented using circuitry, such as a general purpose processor (e.g., any number of general purpose processors for instance different physical processors of the node 215) to be transformed into a special purpose processor to perform any of operations described herein responsive to accessing instructions stored in an electronic memory.

The web service 204 may be implemented using circuitry coupled to the circuitry of the agent 203, e.g., coupled over a network. The circuitry to implement the web service 204 may include a general purpose processor (e.g., any number of general purpose processors) to be transformed into a special purpose processor to perform any of operations described herein responsive to accessing instructions stored in an electronic memory (and this circuitry may be of any application server described with reference to FIGS. 1A-B, e.g., a different application server than an application server including circuitry to implement the agent 203). Similarly, the version tracker 202 may be implemented using circuitry coupled to the circuitry of the web service 204, e.g., coupled over a network. The circuitry to implement the version tracker 202 may include a general purpose processor (e.g., any number of general purpose processors) to be transformed into a special purpose processor to perform any of operations described herein responsive to accessing instructions stored in an electronic memory (and this circuitry may be of any application server described with reference to FIGS. 1A-B, e.g., a different application server than an application server including circuitry to implement the web service 204).

Similarly, other components of the computing system 200 may be implemented using similar circuitry (and this circuitry may be of any application server described with reference to FIGS. 1A-B, e.g., a different application server than an application server including circuitry to implement the version tracker 202). The server manifest API 206 may store information about all the components of an environment, e.g., the environment described with reference to FIGS. 1A-B. For instance, the server manifest API 206 may store information about current application servers in the environment (in some examples, the server manifest API may be operated by a third party device such as a device operated by a third party such as a cloud provider). This information may be changed responsive to a server (e.g., an application server) being added to the environment, or the server being taken offline. This information may inventory all the current components of the environment. The configuration management system 221 may retain values defining host-based firewall configurations to be used in the environment, such as values defining host-based firewall configurations to be used by some or all application servers of the environment, e.g., values defining the firewall configuration 230 to be used by the node 215 and/or firewall configurations to be used by application servers of the web service 204, the configuration management system 221, and/or the version tracker 202.

The version tracker 202 may be configured to monitor a state of the environment of computing system 200. The version tracker 202 may be configured to change, e.g., monotonically increment, a version count responsive to a detected change in the environment based on the monitoring. For example, the version tracker 202 may detect a new node 215 brought online in the environment based on the monitoring, and may increment the version count responsive to detecting the change in the environment. In some examples, the monitoring may include communicating with a node manifest API, such as server manifest API 206. The current version count may be accessible by other components of the computing system 200, such as a configuration management server 221 a configuration management system 201 and/or the web service 204.

In some examples, the version tracker 202 may maintain counts for one or more roles. For instance, the version tracker 202 may maintain a count for a database role, a web server role, or the like. The version tracker 202 may change selected one(s) of the counts based on the detected change (e.g., the version tracker 202 may increment counts for selected roles that need to be "aware" of the detected change to the environment).

The agent 203 may, e.g., a polling agent, may be similar to any agent described herein. The agent 203 may be configured transmit a request to the web service 204 at various times. In some examples, the agent 203 may transmit the requests based on a polling interval, e.g., a periodic interval. In some examples, the agent 203 may use a decay timer to select times for transmitting the request. In some examples, requests based on a decay tinier may be sent at an average of every ninety seconds.

Each request may include version information. The version information may indicate an existing host-based firewall configuration (not shown) used by the node 215.

The web service 204 may be similar to any web service described herein. The web service 204 may receive requests from agents of each node in the environment, including from agent 203 of node 215. As mentioned previously, the computing system 200 may include other nodes (not shown), such as other application servers similar to node 215 (node 215 may be associated with a web server, in some examples, and it may be one node of a group of nodes associated with one or more web servers). Also, as mentioned previously, the web service 204, the configuration management system 221, and/or the version tracker 202 may be implemented on nodes different than node 215. Each node may include an agent similar to agent 203.

The computing system 200 may be configured to compare a version indicated by the version information to a current value of a version count provided by the version tracker 202. In examples where the version tracker 202 maintains more than one count (e.g., different counts for different roles), the computing system 200 may be configured to identify a role corresponding to the node 215, select one of the version counts for the identified role, and compare the version indicated by the version information to a current value of the appropriate version count. In some examples, the web service 204 may check-in with the configuration management system 201 based on the version information. The configuration management system 201 may be configured to identify whether to converge the node 215 based on whether the version information corresponds the current value of the version count. The configuration management system 201 may respond to the web service 204 with an indication of current, or not.

Responsive to a determination to converge the node 215 (e.g., not current), the computing system 200 may cause the client 222 to initiate a converge, which may cause the computing system 200 to configure the host-based firewall configuration 230 on the node 215. In some examples, the web service 204 may respond to the request from the agent 203 based on whether the web service 204 receives an indication of current, or not. In the case of not current, the agent 203 may signal the client 222 to initiate the converge.

Configuring the host-based firewall configuration may include sending code (e.g., a runbook) to the node 215, that when executed by the node 215, causes the node 215 to perform security actions. These security actions may cause the node 215 to configure users on the system, display outputs, enforce rules about software that can be installed, configure antivirus settings, configuring/scheduling a cron job, or the like, or combinations thereof. The configuration management system 201 may select the code based on values of codebooks and/or databooks in a repository of the configuration management system 201.

Based on the above-described operation of the computing system 200, appropriate converges may be triggered and the new web server and one or more other components of the environment (such as the database) may receive appropriate host-based firewall configurations as requests from other nodes are received (e.g., no service interruption to the cloud service in association with the scaling). To illustrate, consider an example in which a cloud service is provided by one or more web servers in communication with a database in an environment. To scale the cloud service, at times a new web server may need to be brought on-line, and this new web server may need to communicate with the database similar to the one or more web servers in order to operate correctly at run time. Not only will the new web server need a host-based firewall configuration to recognize the database, the database may have a host-based firewall configuration update (an existing host-based firewall configuration of the database server may not be "aware" of the new web server) function correctly at run time (e.g., to provide access to the new web server).

The version tracker 202 may identify the new web server based on monitoring the environment, may detect the event of adding the new web server based on the monitoring, and may increment the version count. An agent of the database (not shown, similar to the agent 203) may report version information for its host-based firewall configuration at intervals to the web service 204. At one of the intervals following an incrementing by the version tracker, the web service 204 may cause an agent and/or client of the database (not shown, similar to the agent 203 and the client 222, respectively) to converge the database with the configuration management server 221. This converge may result in the database operating an updated host-based firewall configuration that is interoperable with the new web server, which may allow the cloud service to operate securely following the scaling.

Figure 3:
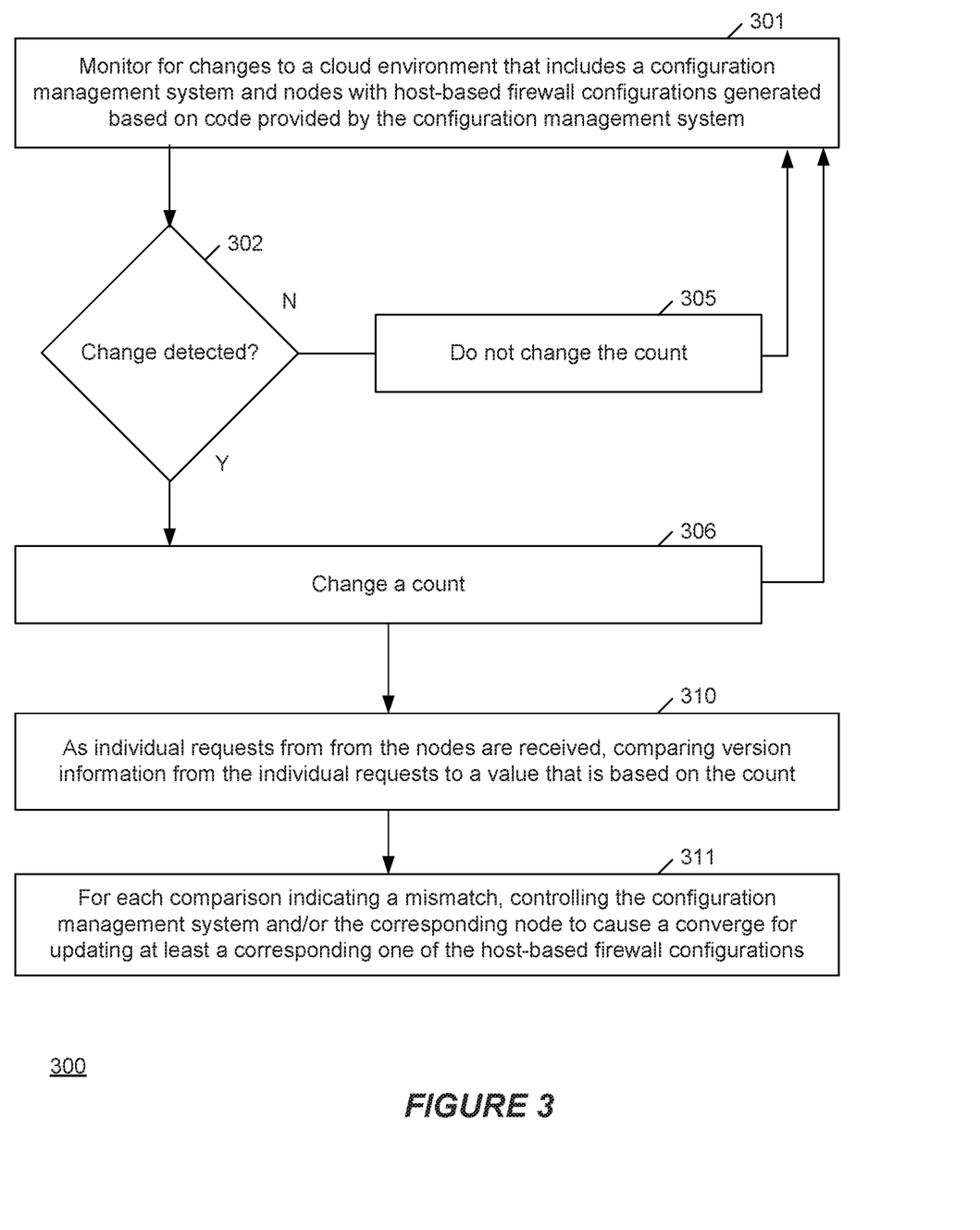
FIG. 3 illustrates a process that may be performed by the computing system of FIG. 2 to perform automated host-based firewall configuration management, in some embodiments.

FIG. 3 illustrates a process 300 that may be performed by the computing system 200 of FIG. 2 to perform automated host-based firewall configuration management, in some embodiments. In block 301, the computing system 200 may monitor for changes to a cloud environment that may include a configuration management system and nodes with host-based firewall configurations generated based on code provided by the configuration management system. The computing system 200 may use a node manifest to monitor for the changes (e.g., the addition or removal of a node from the manifest may indicate the change).

If a change is detected in diamond 302, the computing system 200 may change a count. For instance, the computing system 200 may increment (e.g., monotonically increment) the count. A version of one role of a plurality of roles for the cloud environment may be based on the count, in some examples. The count is not changed if the change is not detected in block 305.

In block 310, as individual requests from the nodes are received, the computing system 200 may compare version information from the individual requests to a value that is based on the count. Each comparison may be using a current value of version information that is based on the count (e.g., the current value of the version information at a time associated with the individual request).

In block 311, for each comparison indicating a mismatch, the computing system 200 may control the configuration management system and/or the corresponding node to cause a converge for updating at least the corresponding one of the host-based firewall configurations. For instance, the computing system 200 may control a configuration management system client on the node to check in with a configuration management system server to trigger the converge.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that sonic of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computing system, comprising:
a processing system; and
a memory device coupled to the processing system and including instructions stored thereon that, in response to execution by the processing system, are operable to perform operations including:
monitor for changes to a cloud environment that includes a configuration management system and two or more nodes to operate two or more host-based firewall configurations, respectively, the host-based firewall configurations generated based on code provided by the configuration management system;
in response to a detection of a cloud environment change corresponding to any node of a group of at least two of the nodes, increment a same version count associated with the cloud environment;
identify a node request associated with the group, the node request including version information for a corresponding one of the host-based firewall configurations;
compare the version information from the node request to a current value of the same version count; and
in response to the comparison indicating a mismatch, control a requesting node of the node request to converge with the configuration management system to cause the requesting node to perform a host-based firewall configuration update;
wherein the nodes of the group comprise first nodes having a same first role of a predefined plurality of roles, the version count comprises a first version count, the node request comprises a first node request, and the operations further include:
in response to a detection of a cloud environment change corresponding to any node of a group of one or more second nodes of the two or more nodes, increment a second version count associated with the cloud environment, each second node of the one or more second nodes has a same second role of the predefined plurality of roles, wherein the second role is different than the first role;
identify a second node request associated with the second role, the second node request including version information for a corresponding one of the host-based firewall configurations;
compare the version information from the second node request to a current value of the second version count and
in response to the comparison to the current value of the second version count indicating a mismatch, control a requesting node of the second node request to converge with the configuration management system to cause the requesting of the second node request to operate with a new host-based firewall configuration.

2. The computing system of claim 1, wherein the operations further include monitor for the changes to the cloud environment using a node manifest associated with the cloud environment.

3. The computing system of claim 2, wherein detection of the cloud environment change is based on an addition of a third node to the node manifest.

4. The computing system of claim 2, wherein the detection of the cloud environment change is based on removal of one of the two or more nodes from the node manifest.

5. The computing system of claim 1, wherein the requesting node of the first node request or the second node request is operable to employ a corresponding one of the host-based firewall configurations based on a converge prior to transmitting the first node request or the second node request, respectively, and wherein control the requesting node of the first node request or the second node request to converge with the configuration management system further comprises control the requesting node of the first node request or the second node request to re-converge with the configuration management system.

6. The computing system of claim 1, wherein the two or more nodes include two or more processing devices, respectively, each processing device operable to provide a node request including current version information at each occurrence of an interval, wherein the received first node request comprises one of the provided node requests and the received second node request comprises a different one of the provided node requests.

7. The computing system of claim 6, wherein the intervals comprise periodic intervals.

8. The computing system of claim 6, wherein each processor is further operable to select its interval based on an individual decay timer.

9. The computing system of claim 1, wherein the first node request or the second node request is from an agent of the requesting node of the first node request or the requesting node of the second node request, respectively, wherein the agent has a limited privilege level that is different than a root level privilege level.

10. A method of operating a computing system of a cloud environment that includes a configuration management system and two or more nodes to operate two or more host-based firewall configurations, the method comprising:
monitoring, using a processing system of the computing system, for changes to the cloud environment;
in response to detection of a cloud environment change corresponding to any nodes of a group of at least two of the nodes, modifying, using the processing system, a same version count;
identifying, using the processing system, a node request associated with the group, the node request including a value indicating a version of a corresponding one of the host-based firewall configurations;
comparing, using the processing system, the value of the node request to a current value of the same version count; and
controlling a requesting node of the node request to cause said requesting node to converge with the configuration management system in response to the comparison indicating a mismatch;
wherein the nodes of the group comprise first nodes having a same first role of predefined plurality of roles, the version count comprises a first version count, the node request comprises a first node request, and the method further comprises:
in response to a detection of a cloud environment change corresponding to any node of a group of one or more second nodes of the two or more nodes, modifying, using the processing system, a second version count associated with the cloud environment, each second node of the one or more second nodes has a same second role of the predefined plurality of roles, wherein the second role is different than the first role;
identifying, using the processing system, a second node request associated with the second role, the second node request including version information for a corresponding one of the host-based firewall configurations;
comparing, using the processing system, the version information from the second node request to a current value of the second version count; and
controlling a requesting node of the second node request to converge with the configuration management system to cause the requesting of the second node request to converge with the configuration management system in response to the comparison to the current value of the second version count indicating a mismatch.

11. The method of claim 10, wherein the host-based firewall configurations comprise first host-based firewall configurations, and the method further comprises operating a second host-based firewall configuration on the requesting node of the first node request or the second node request following the corresponding converge.

12. The method of claim 11, wherein the cloud environment change includes addition of a third node to the cloud environment, and the method further comprises identifying whether to accept a message from the third node at the two or more nodes using the second host-based firewall configuration.

13. The method of claim 10, wherein the modifying the first version count or the second version count further comprises:
monotonically increasing or decreasing the first version count or the second version count, respectively.

14. The method of claim 10, wherein said monitoring utilizes a node manifest.

15. A system to automate host-based firewall configuration management in a cloud environment including one or more first network devices to operate one or more first host-based firewall configurations, respectively, the system comprising:
a version tracker operable to:
monitor a state of the cloud environment, to increment a version count responsive to a change to the cloud environment;
identify, from a predefined plurality of roles, a role of a second different network device to be added to the cloud environment; and
select the version count from a plurality of version counts based on the identified role;
the one or more first network devices include one or more polling agents, respectively, each polling agent operable to, at intervals, transmit version information for the first network device to a predetermined web service for comparison to a current value of the version count; and
a configuration management system accessible by the predetermined web service, the configuration management system operable to generate code to deploy a second different host-based firewall configuration, the second different host-based firewall configuration to control intra-environment communication between a corresponding one of the one or more first network devices and the second different network device;
the predetermined web service operable to control the configuration management system to deploy the second host-based firewall configuration on the corresponding network device of the one or more first network devices based on a result of the comparison.

16. The system of claim 15, wherein the version tracker is implemented using a processor of a first application server of the one or more first network device and wherein the predetermined web service is implemented using a processor of a second application server of the one or more first network devices.

17. The system of claim 16, wherein the one or more polling agents are implemented using one or more processors of the one or more first network devices, respectively.

18. The system of claim 17, wherein the configuration management system includes a client and a server, the client implemented using the one or more processors of the one or more first network devices, the server implemented using a processor of a third application server of the one or more first network devices.

19. The system of claim 15, wherein the one or more first network devices include a database server operable to serve a web server of the one or more first network devices, and wherein the second network device comprises a different network server served by the database server.

20. The system of claim 15, wherein an unselected version count of the plurality of version counts is not incremented responsive to the change in the cloud environment.

* * * * *